(12) United States Patent
Heroux et al.

(10) Patent No.: US 10,914,901 B2
(45) Date of Patent: Feb. 9, 2021

(54) LATERAL MOUNTING OF OPTOELECTRONIC CHIPS ON ORGANIC SUBSTRATE

(71) Applicant: INTERNATIONAL BUSINESS MACHINES CORPORATION, Armonk, NY (US)

(72) Inventors: Jean Benoit Heroux, Kawasaki (JP); Masao Tokunari, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 15/786,067

(22) Filed: Oct. 17, 2017

(65) Prior Publication Data

US 2019/0113695 A1    Apr. 18, 2019

(51) Int. Cl.
*G02B 6/42* (2006.01)

(52) U.S. Cl.
CPC .......... *G02B 6/4206* (2013.01); *G02B 6/422* (2013.01); *G02B 6/4202* (2013.01); *G02B 6/423* (2013.01); *G02B 6/425* (2013.01); *G02B 6/428* (2013.01); *G02B 6/4214* (2013.01); *G02B 6/4219* (2013.01); *G02B 6/4238* (2013.01); *G02B 6/4243* (2013.01); *G02B 6/4245* (2013.01); *G02B 6/4292* (2013.01); *G02B 6/4249* (2013.01)

(58) Field of Classification Search
CPC .. G02B 6/4206; G02B 6/4202; G02B 6/4214; G02B 6/4219; G02B 6/422; G02B 6/423; G02B 6/4238; G02B 6/4243; G02B 6/4245; G02B 6/4249; G02B 6/425; G02B 6/428; G02B 6/4292
See application file for complete search history.

(56) References Cited

U.S. PATENT DOCUMENTS

| 3,398,273 | A | * | 8/1968 | Brom | F21V 5/00 362/309 |
|---|---|---|---|---|---|
| 5,600,741 | A | * | 2/1997 | Hauer | G02B 6/4204 385/14 |
| 5,924,783 | A | * | 7/1999 | Jones | H04N 5/7441 348/E5.141 |
| 6,044,096 | A | * | 3/2000 | Wolak | G02B 27/09 372/109 |
| 6,086,263 | A | * | 7/2000 | Selli | B08B 7/0028 385/33 |
| 6,556,608 | B1 | * | 4/2003 | Gilliland | H01S 5/02248 372/43.01 |
| 6,668,112 | B1 | * | 12/2003 | Kaneda | G02B 6/4214 359/341.32 |

(Continued)

*Primary Examiner* — Peter Radkowski
(74) *Attorney, Agent, or Firm* — Tutunjian & Bitetto, P.C.; Randall Bluestone (57) ABSTRACT

A chip packaging structure that includes an optoelectronic (OE) chip mounted on a first surface of a substrate and whose optically active area is directed laterally; and a lens array for the optoelectronic (OE) chip that is mounted on the first surface of the substrate and faces to the optoelectronic (OE) chip, wherein the lens array has inside a reflector reflecting light from a first direction to a second direction, in which the first direction is substantially perpendicular to the second direction.

13 Claims, 10 Drawing Sheets

(56) References Cited

U.S. PATENT DOCUMENTS

| | | | |
|---|---|---|---|
| 7,014,988 B2* | 3/2006 | DeVoe | G02B 6/1221 430/290 |
| 7,064,962 B2* | 6/2006 | Wang | G02B 6/4292 361/730 |
| 7,206,470 B2* | 4/2007 | Li | G02B 6/126 385/14 |
| 7,440,646 B2* | 10/2008 | Chen | G02B 6/4249 385/14 |
| 7,463,831 B2* | 12/2008 | Wang | G02B 6/4292 361/730 |
| 7,504,668 B2* | 3/2009 | Wang | G02B 6/4292 257/98 |
| 7,559,703 B2* | 7/2009 | Tamanuki | G02B 6/423 385/14 |
| 7,601,484 B2* | 10/2009 | DeVoe | G02B 6/1221 430/321 |
| 7,720,333 B2* | 5/2010 | Tamanuki | G02B 6/423 385/14 |
| 8,265,432 B2* | 9/2012 | Doany | G02B 6/4201 257/432 |
| 8,290,008 B2* | 10/2012 | Andry | G02B 6/4204 257/690 |
| 8,530,118 B2* | 9/2013 | DeVoe | G02B 6/1221 385/143 |
| 8,559,474 B2* | 10/2013 | Andry | G02B 6/4204 257/690 |
| 8,676,006 B2* | 3/2014 | Morioka | G02B 6/4214 385/14 |
| 9,011,020 B2* | 4/2015 | Ty Tan | G02B 6/43 385/53 |
| 9,086,551 B2* | 7/2015 | Heroux | G02B 6/4215 |
| 9,182,551 B2* | 11/2015 | Oyagi | G02B 6/428 |
| 9,213,152 B2* | 12/2015 | Shastri | G02B 6/42 |
| 9,213,155 B2* | 12/2015 | Miao | G02F 1/093 |
| 9,274,290 B2* | 3/2016 | Kachru | G02B 6/42 |
| 9,335,494 B2* | 5/2016 | Razdan | G02B 6/423 |
| 9,470,858 B2* | 10/2016 | Houbertz-Krauss | G02B 6/4206 |
| 9,475,149 B1* | 10/2016 | Testrake | B29D 11/00317 |
| 9,547,142 B1* | 1/2017 | Chen | G02B 6/4286 |
| 9,581,776 B1* | 2/2017 | Lee | G02B 6/4292 |
| 9,606,305 B1* | 3/2017 | Yu | G02B 6/4292 |
| 9,726,826 B2* | 8/2017 | Ooi | G02B 6/322 |
| 9,726,839 B2* | 8/2017 | Shimura | G02B 6/4246 |
| 9,739,948 B2* | 8/2017 | Watanabe | G02B 6/32 |
| 9,793,682 B2* | 10/2017 | Caer | H01S 5/0261 |
| 9,939,593 B2* | 4/2018 | Miao | G02F 1/093 |
| 10,043,787 B2 | 8/2018 | Tokunari | |
| 10,215,938 B2* | 2/2019 | Chang | G02B 6/32 |
| 2002/0197003 A1* | 12/2002 | Kobayashi | G02B 6/352 385/18 |
| 2003/0067951 A1* | 4/2003 | Gilliland | H01S 5/02248 372/36 |
| 2004/0017977 A1* | 1/2004 | Lam | G02B 6/4204 385/49 |
| 2004/0047637 A1* | 3/2004 | Wang | G02B 6/4292 398/164 |
| 2004/0101247 A1* | 5/2004 | Chen | G02B 6/29367 385/47 |
| 2005/0135726 A1* | 6/2005 | Chen | G02B 6/4249 385/14 |
| 2005/0152633 A1* | 7/2005 | Li | G02B 6/126 385/14 |
| 2005/0175275 A1* | 8/2005 | Kawamoto | G02B 6/358 385/18 |
| 2005/0208431 A1* | 9/2005 | Devoe | G02B 6/1221 430/321 |
| 2005/0224946 A1* | 10/2005 | Dutta | G02B 6/12002 257/686 |
| 2006/0023990 A1* | 2/2006 | Shih | G02B 6/4214 385/14 |
| 2006/0078831 A1* | 4/2006 | DeVoe | G02B 6/1221 430/321 |
| 2006/0133820 A1* | 6/2006 | Wang | G02B 6/4292 398/164 |
| 2006/0133821 A1* | 6/2006 | Wang | G02B 6/4292 398/164 |
| 2007/0058981 A1* | 3/2007 | Tamanuki | G02B 6/423 398/141 |
| 2007/0223865 A1* | 9/2007 | Lu | G02B 6/4292 385/90 |
| 2009/0226130 A1* | 9/2009 | Doany | G02B 6/4201 385/14 |
| 2009/0238577 A1* | 9/2009 | Tamanuki | G02B 6/423 398/141 |
| 2010/0027956 A1* | 2/2010 | DeVoe | G02B 6/1221 385/142 |
| 2010/0208756 A1* | 8/2010 | Noh | G02B 6/4206 372/20 |
| 2011/0044369 A1* | 2/2011 | Andry | G02B 6/4204 372/50.124 |
| 2012/0063718 A1* | 3/2012 | Steijer | G02B 6/4201 385/14 |
| 2012/0326290 A1* | 12/2012 | Andry | G02B 6/4204 257/680 |
| 2013/0182996 A1* | 7/2013 | Shastri | G02B 6/42 385/14 |
| 2013/0216190 A1* | 8/2013 | Haley | G02B 6/423 385/79 |
| 2014/0169734 A1* | 6/2014 | Kachru | G02B 6/42 385/33 |
| 2015/0010273 A1* | 1/2015 | Oyagi | G02B 6/428 385/33 |
| 2015/0020964 A1* | 1/2015 | Tanazawa | G02B 3/0012 156/297 |
| 2015/0117811 A1* | 4/2015 | Heroux | G02B 6/4215 385/14 |
| 2015/0185426 A1* | 7/2015 | Miao | G02F 1/093 385/33 |
| 2015/0226917 A1* | 8/2015 | Heroux | G02B 6/4215 385/14 |
| 2015/0338587 A1* | 11/2015 | Houbertz-Krauss | G02B 6/4206 385/92 |
| 2015/0355409 A1* | 12/2015 | Yanagisawa | G02B 6/322 385/14 |
| 2016/0062062 A1* | 3/2016 | Miao | G02F 1/093 385/14 |
| 2016/0161684 A1* | 6/2016 | Kachru | G02B 6/42 398/38 |
| 2016/0170155 A1* | 6/2016 | Dorrestein | G02B 6/423 385/88 |
| 2016/0209596 A1* | 7/2016 | Ooi | G02B 6/322 |
| 2016/0291268 A1* | 10/2016 | Shimura | G02B 6/4246 |
| 2016/0311054 A1* | 10/2016 | Testrake | B29D 11/00317 |
| 2016/0313519 A1* | 10/2016 | Yanagisawa | G02B 6/4244 |
| 2017/0059790 A1* | 3/2017 | Koyama | G02B 6/421 |
| 2017/0141533 A1* | 5/2017 | Caer | H01S 5/0261 |
| 2017/0184793 A1* | 6/2017 | Watanabe | G02B 6/32 |
| 2017/0269316 A1* | 9/2017 | Chang | G02B 6/32 |
| 2018/0196199 A1 | 7/2018 | Numata et al. | |

\* cited by examiner

LATERAL MOUNTING OF OPTOELECTRONIC CHIPS ON ORGANIC SUBSTRATE

BACKGROUND

Technical Field

The present invention generally relates to electrical device packaging, and more particularly to lateral mounting of optoelectronic chips on an organic substrate.

Description of the Related Art

In optical multi-chip modules (optical MCM), a light from or to an optoelectronic chip, such as a vertical-cavity surface-emitting laser (VCSEL) and photo diode (PD) components that are coupled to a waveguide through a 45 degree angled mirror, and then to an optical fiber array through a connector with lens arrays. It has been determined that insertion losses in the optical multi-chip modules (optical MCM) mainly occur at couplings between the optoelectronic (OE) chips and the waveguides, as well as insertion losses being present between the waveguides and the fiber arrays. The insertion losses result from the distances between the components that the light must travel and the difference in the core sizes, as well as the number of apertures through which the light is passed. The link budget can be more severe due to bandwidth improvement, decrease of the photodetecting area and receiver sensitivity of the photo diode (PD).

SUMMARY

In accordance with an embodiment of the present invention, an optoelectronic (OE) chip packaging system is provided that includes an optoelectronic (OE) chip that is mounted on a top surface of a substrate and whose optically active (emission/detection) area is directed laterally. The optoelectronic chip packaging system may also include lens array for the optoelectronic (OE) chip that is mounted on the top surface of the substrate, and is positioned to face to the optoelectronic (OE) chip. The lens array may include a reflector for reflecting light from lateral/downward direction to upward/lateral direction (emission/detection).

In accordance with another embodiment of the present invention, a method for chip packaging is provided that includes mounting an optoelectronic (OE) chip on a first surface of a substrate having an optically active area is directed laterally; and mounting a lens array for the optoelectronic (OE) chip that on the first surface of the substrate that faces to the optoelectronic (OE) chip. The lens array can have a reflector for reflecting light from a first direction to a second direction, in which the first direction is substantially perpendicular to the second direction.

In accordance with another embodiment of the present invention, a method for manufacturing an optoelectronic (OE) chip packaging system is provided that includes forming patterns of transmission lines and alignment marks for an optoelectronic (OE) chip and a lens array for the optoelectronic (OE) chip. The patterns of transmission lines and alignments marks are formed on a top surface of a substrate. In a following step, an insulating layer is formed over the patterns of the transmission lines and the alignment marks. Vias are formed to place solder for the optoelectronic (OE) chip, and to connect to a driver integrated Circuit (IC) chip for the optoelectronic (OE) chip. The vias can be formed by laser ablation. The vias for the optoelectronic (OE) chip are filled with solder and the vias for the driver IC chip are filled with conductive material. Holes are formed to mount the OE chip and the lens array on the top surface of the substrate, while using the patterns of the alignment marks for the OE chip and the lens array formed on the top surface of the substrate. The method may continue with mounting the OE chip on the holes for the OE chip and the driver IC chip on the vias filled with conductive material, and reflowing solder filled the vias for the OE chip. Thereafter, the lens array is mounted on the holes for the lens array; and adhesive is applied to the OE chip and the lens array to fix the OE chip and the lens array to the substrate.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the structures and methods described herein provide for lateral mounting of optoelectronic chips on an organic substrate. In some embodiments, the vertical-cavity surface-emitting laser (VCSEL) and the photo diode (PD) components of the device may be mounted so that the light traveling to and from the emission and/or the detection area is directed laterally, and that the light is coupled through connectors with lens arrays without using waveguides. In some embodiments, the fibers arrays are fit to the connectors that include the lens arrays with guide pins, which provide for a mechanical alignment and fitment. It has been determined that insertion losses in prior optical multichip modules (optical MCM) mainly occur at couplings between the optoelectronic (OE) chips and the waveguides, as well as insertion losses being present between the waveguides and the fiber arrays. The methods and structures provide herein can reduce the aforementioned insertion losses by removing waveguides. The methods and structures of the present invention are now describe with greater detail referring to FIGS. 1-21

FIGS. 1-4 depict some embodiments of an optoelectronic (OE) chip packaging system that can include a substrate 5; an optoelectronic (OE) chip 10 which is mounted on a top surface of the substrate 5 and whose optically active (emission/detection) area is directed laterally; and a lens array 15 for the optoelectronic (OE) chip 10, which is mounted on the top surface of the substrate 5, and faces to the optoelectronic (OE) chip 10. The lens array 15 can include a reflector 16 for reflecting light from lateral/downward L1 direction to upward/lateral direction (emission/detection) V1.

The substrate 5 is typically an organic substrate. An organic substrate includes carbon. The organic substrate may be polymeric. Some examples of organic substrate compositions for the substrate may include polyethylene terephthalate (PET) or polycarbonate (PC) or derivatives thereof.

The optoelectronic (OE) chip 10 may be a vertical-cavity surface-emitting laser (VCSEL) and/or a photo diode (PD) component. The vertical-cavity surface-emitting laser (VCSEL) is a type of semiconductor laser diode with laser beam emission perpendicular from the top surface, contrary to edge-emitting semiconductor lasers (also in-plane lasers) which emit from surfaces formed by cleaving the individual chip out of a wafer. In some embodiments, the vertical-cavity surface-emitting laser (VCSEL) consists of two distributed Bragg reflector (DBR) mirrors parallel to the wafer surface with an active region consisting of one or more quantum wells for the laser light generation in between. The planar DBR-mirrors can consist of layers with alternating high and low refractive indices. Each layer has a thickness of a quarter of the laser wavelength in the material, yielding intensity reflectivity above 99%. High reflectivity mirrors are required in VCSELs to balance the short axial length of the gain region.

In some embodiments, in VCSELs the upper and lower mirrors are doped as p-type and n-type materials, forming a diode junction. In more complex structures, the p-type and n-type regions may be embedded between the mirrors, requiring a more complex semiconductor process to make electrical contact to the active region, but eliminating electrical power loss in the DBR structure. VCSELs for wavelengths from 650 nm to 1100 nm are typically based on gallium arsenide (GaAs) wafers with DBRs formed from GaAs and aluminum gallium arsenide ($Al_xGa_{(1-x)}$ as).

When the optoelectronic (OE) chip 10 is a vertical-cavity surface-emitting laser (VCSEL), the optoelectronic chip 10 (OE) is emitting a light signal, i.e., beam, in the lateral direction L1, which is substantially parallel, to the upper surface of the substrate 5, towards the lens array 15 that is mounted to the upper surface of the substrate 5. Photodiodes (PD) are semiconductor devices that convert light into an electrical current. The current is generated when photons are absorbed in the photodiode. Photodiodes are similar to regular semiconductor diodes. Many diodes for use as a photodiode use a PIN junction rather than a p-n junction, to increase the light sensitivity.

The lens array 15 for the optoelectronic (OE) chip 10, which is mounted on the top surface of the substrate 5, and faces to the optoelectronic (OE) chip 10, may include at least one lens 17, e.g., micro-lens, that can be used to couple light from the photodiodes and/or vertical-cavity surface-emitting laser (VCSEL) that provide the optoelectronic (OE) chip 10 to optical fibers 19 that are engaged to the fiber array 20 through its own lens array 21.

A microlens is a small lens, generally with a diameter less than a millimeter (mm) and often as small as 10 micrometers (μm). In some embodiments, the microlens 17 may be a single element with one plane surface and one spherical convex surface to refract the light. A different type of microlens 17 has two flat and parallel surfaces and the focusing action is obtained by a variation of refractive index across the lens. These are known as gradient-index (GRIN) lenses. Some microlenses 17 can achieve their focusing action by both a variation in refractive index and by the surface shape. Another class of microlens 17, sometimes known as micro-Fresnel lenses, focus light by refraction in a set of concentric curved surfaces. Binary-optic microlenses focus light by diffraction. In some embodiments, a microlens arrays contain multiple lenses 17 formed in a one-dimensional or two-dimensional array on a supporting substrate. It is noted that the lens array 15 that is mounted to the upper surface of the substrate 5 may include any of the aforementioned microlens 17.

Figure 7:
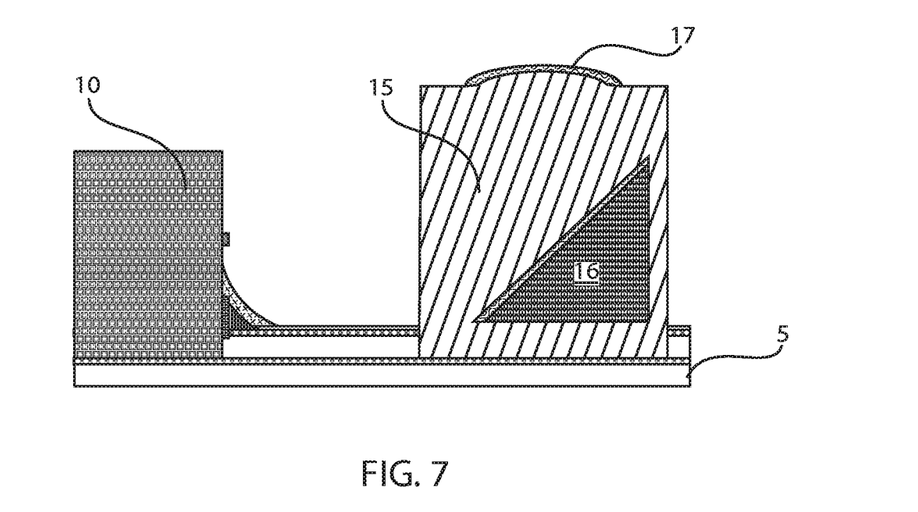
FIG. 7 is a magnified side cross-sectional view of a lens array that is depicted in FIG. 5, in accordance with an embodiment of the present invention.

In some embodiments, the lens array 15 may include a reflector 16. In some embodiments, the reflector 16 is positioned within a hollow portion of lens array 15. The lens array 15 may have an inclined surface reflecting light from the lateral/downward direction to the upward/lateral direction. In some embodiments, the lens array 15 for the OE chip 10, photodiodes and/or vertical-cavity surface-emitting laser (VCSEL) that provide the optoelectronic (OE) chip 10, include a convex side surface facing to the optically active area of the OE chip and a planar top surface, as depicted in FIGS. 1, 2, 4, 11, 20, and 21. In some embodiments, the lens array 15 for the OE chip 10, photodiodes and/or vertical-cavity surface-emitting laser (VCSEL) that provide the optoelectronic (OE) chip 10, comprises a planar side surface facing to the optically active area of the OE chip 10 and a convex top surface, as depicted in FIGS. 5 and 7.

In some embodiments, as depicted in FIGS. 2, 3, 4, 6, 7, 11, 19, 20, and 21, the space between the lens array 15 for the OE chip 10, photodiodes and/or vertical-cavity surface-emitting laser (VCSEL) that provide the optoelectronic (OE) chip 10, does not include a waveguide. For example, when a waveguide is not present between the lens array 15 and the OE chip 10, photodiodes and/or vertical-cavity surface-emitting laser (VCSEL) that provide the optoelectronic (OE) chip 10, the space separating the lens array 15 from the OE chip 10 may be open. In other embodiments, as depicted in FIG. 5, a waveguide 25 is present between the OE chip 10 and the lens array 15.

Figure 1:
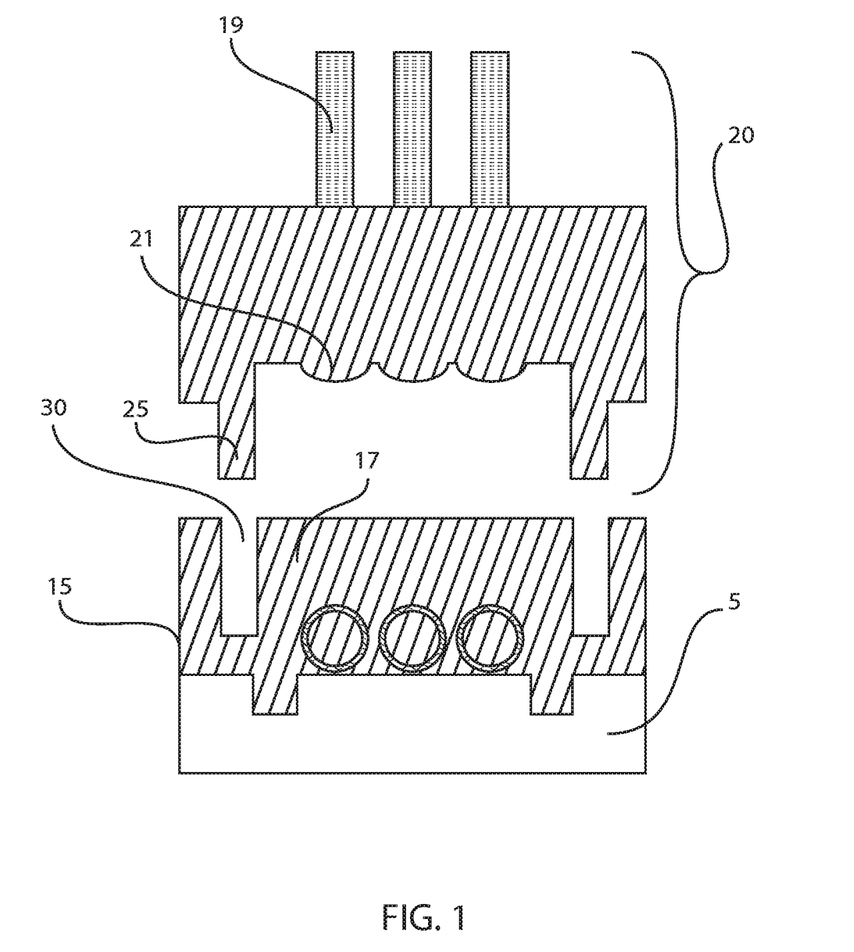
FIG. 1 is a side cross-sectional view showing a fiber array being fitted to a connection with a lens array using guide pins, in accordance with an embodiment of the present invention.
Figure 2:
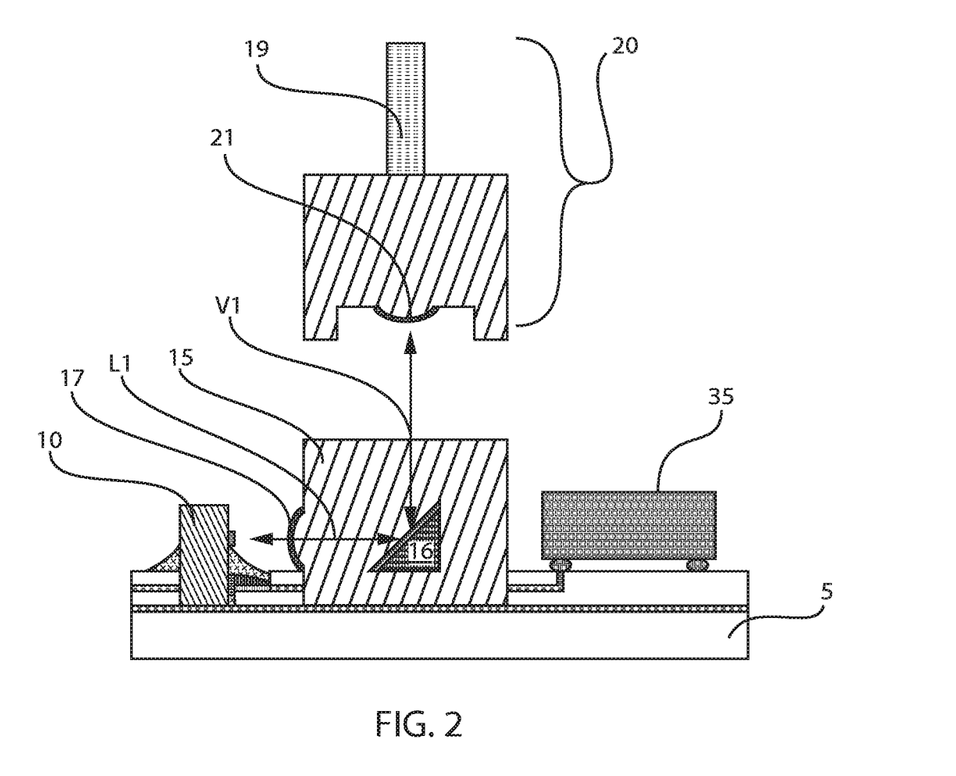
FIG. 2 is a side cross-sectional view depicting the mounting of a vertical-cavity surface-emitting laser (VCSEL) and photo diode (PD) components so that the emission or the detection area is directed laterally, in which the connectors include lens arrays without waveguides, in accordance with one embodiment of the present invention.
Figure 5:
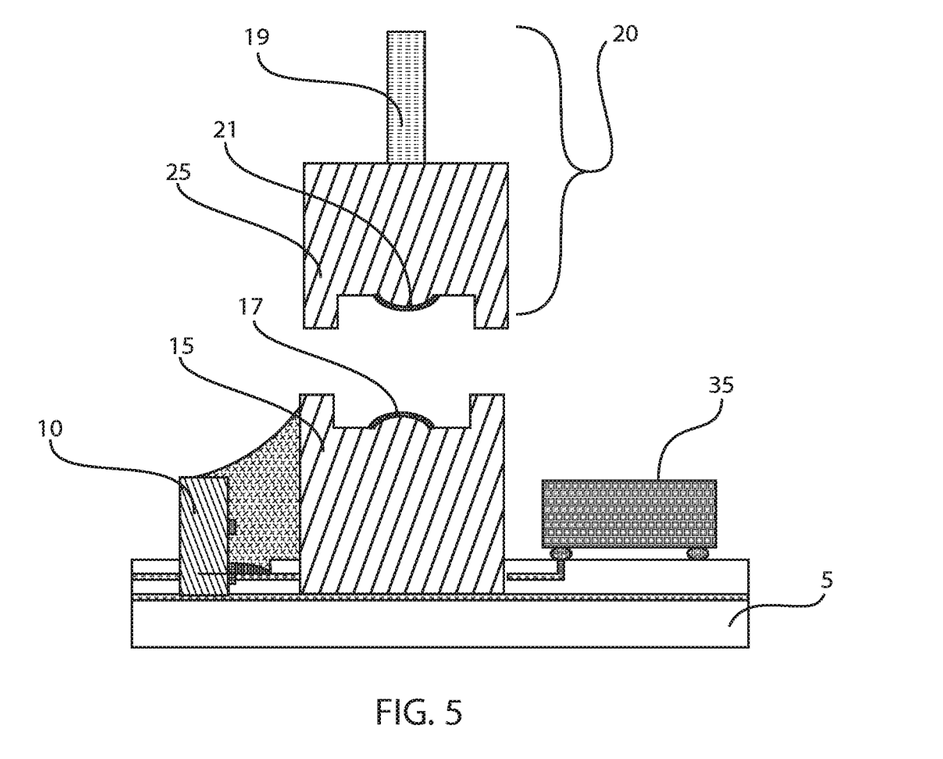
FIG. 5 is a side cross-sectional view depicting the mounting of a vertical-cavity surface-emitting laser (VCSEL) and photo diode (PD) components so that the emission or the detection area is directed laterally, wherein only one of the vertical-cavity surface-emitting laser (VCSEL) and photo diode (PD) components includes a waveguide to a connector including a lens array, in accordance with one embodiment of the present invention.

Referring to FIGS. 1,2 and 5, in some embodiments, the lens array 15 is in communication with a fiber array 20. In some embodiments, the optical fiber 19 in the fiber array 20 may include at least one lens 21 to optically connect to the lens array 15 for the OE chip 10. e.g., photodiodes and/or vertical-cavity surface-emitting laser (VCSEL) that provide the optoelectronic (OE) chip 10. The at least one lens 21 of the fiber array 20 is similar to the lens 17, e.g., microlens 17, of the lens array 15 for the OE chip. Therefore, the description of the at least one lens 17 of the lens array 15 can provide the description for at least one embodiment of the lens 21 for the fiber array 20.

It is noted that there is no waveguide present between the at least one lens 21 of the fiber array 20 and the lens 17, e.g., microlens, of the lens array 15 for the OE chip 10, e.g., photodiodes and/or vertical-cavity surface-emitting laser (VCSEL) that provide the optoelectronic (OE) chip 10. For example, the space separating the lens array 15 from the fiber array 20 may be open.

The alignment between the fiber array 20 and the lens array 15 for the OE chip 10 may be provided by guide pins 25. The guide pins 25 of the fiber array 20 are aligned to cavities 30 having a substantially same geometry in the lens array 15. These pin structures 25 can be monolithic with the lenses 21, and manufactured by for example molding. Alignment tolerance is relieved by using dual lens structure, and can be about 30 um.

Referring to FIGS. 2-6, 11 and 19-21, in some embodiments, the OE chip 10 has the optically active area on the front side thereof, i.e., front side of substrate 5, and an electrode on the back side thereof. i.e., back side of the substrate 5. The device may further include a driver IC (Integrated Circuit) chip 35 for the OE chip 10 that is mounted on the top surface of the substrate 5, and close to the electrode on the back side of the OE chip 10.

Figure 3:
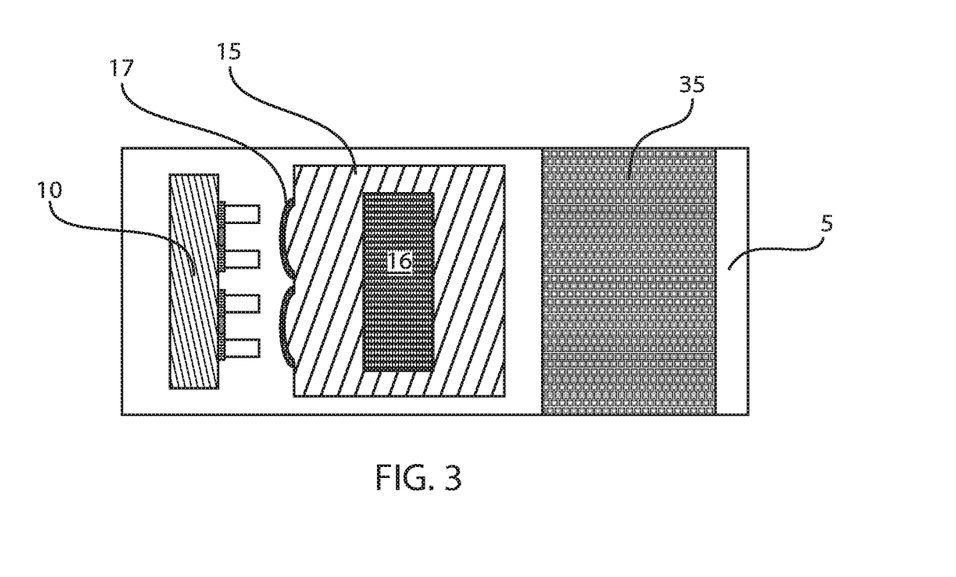
FIG. 3 is a top down view of the structure depicted in FIG. 2.
Figure 4:
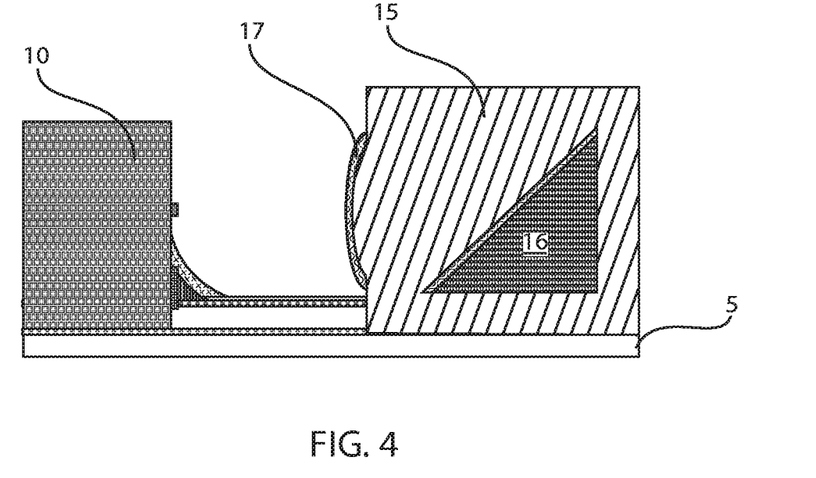
FIG. 4 is a magnified side cross-sectional view of a lens array that is depicted in FIG. 2, in accordance with an embodiment of the present invention.

FIGS. 2-4 depict the mounting of a vertical-cavity surface-emitting laser (VCSEL) and photo diode (PD) components, i.e., OE chip components 10, so that the emission or the detection area is directed laterally, in which the connectors include lens arrays, i.e., lens array 15 and fiber array 20, without waveguides.

Figure 6:
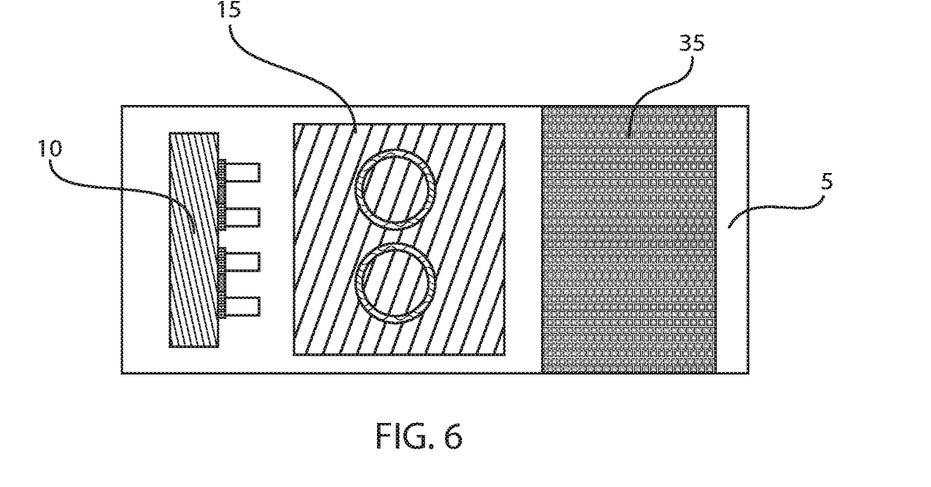
FIG. 6 is a top down view of the structure depicted in FIG. 5.

FIGS. 5-7 is a side cross-sectional view depicting the mounting of a vertical-cavity surface-emitting laser (VCSEL) and photo diode (PD) components, i.e., OE components 10, so that the emission or the detection area is directed laterally, wherein only one of the vertical-cavity surface-emitting laser (VCSEL) and photo diode (PD) components includes a waveguide 30 to a connector including a lens array 15.

Figure 11:
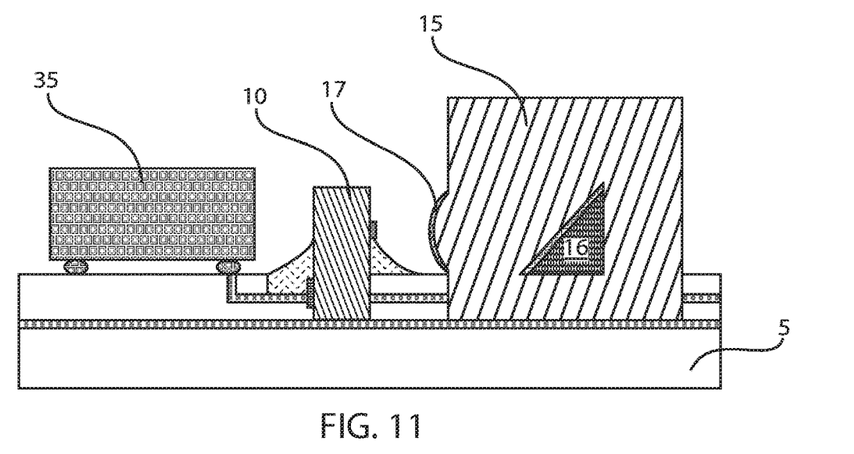
FIG. 11 is a side cross-sectional view of a driver integrated circuit (IC) that is mounted at an opposite side of the lens arrays, in which the transmission line between the integrated circuit and the optoelectronic chip is reduced to lower power consumption, in accordance with one embodiment of the present invention.

FIG. 11 depicts one embodiment of a driver integrated circuit (IC) that is mounted at an opposite side of the lens arrays, in which the transmission line between the integrated circuit 35 and the optoelectronic chip 10 is reduced to lower power consumption.

In accordance with another embodiment of the present invention, a method for manufacturing an optoelectronic (OE) chip packaging system is provided that includes forming patterns of transmission lines and alignment marks for an optoelectronic (OE) chip, and a lens array for the optoelectronic (OE) chip. The patterns of transmission lines and alignments marks are formed on a top surface of a substrate. In a following step, an insulating layer is formed over the patterns of the transmission lines and the alignment marks. Vias are formed to place solder for the optoelectronic (OE) chip, and to connect to a driver integrated Circuit (IC) chip for the optoelectronic (OE) chip. The vias can be formed by laser ablation. The vias for the optoelectronic (OE) chip are filled with solder. Holes are formed to mount the OE chip and the lens array on the top surface of the substrate, while using the patterns of the alignment marks for the OE chip and the lens array formed on the top surface of the substrate. The method may continue with mounting the OE chip on the holes for the OE chip and the driver IC chip on the vias filled with conductive material, and reflowing solder filled the vias for the OE chip. Thereafter, the lens array is mounted on the holes for the lens array; and adhesive is applied to the OE chip and the lens array to fix the OE chip and the lens array to the substrate. The details of the aforementioned method are now described with greater detail with reference to FIGS. 8-21.

Figure 12A:
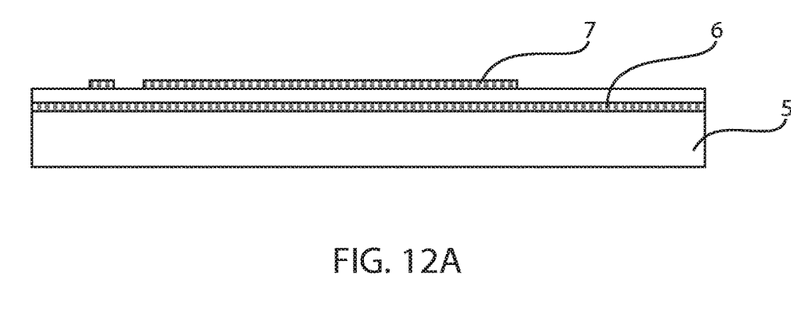
FIG. 12A is a side cross-sectional view of a high speed transmission line, and alignment mark for the optoelectronic chip and lens array.
Figure 12B:
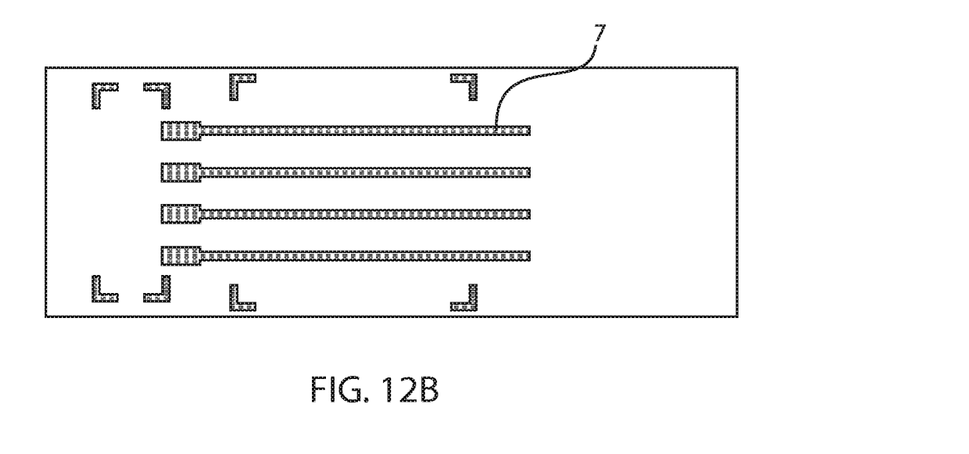
FIG. 12B is a top down view of the structure depicted in FIG. 12A.

FIGS. 12A and 12B depict one embodiment of an initial structure that can be used in the method of forming the system including the OE chip packaging system. In some embodiments, the initial structure may include a high speed transmission line, and alignment mark for the optoelectronic (OE) chip 10 and lens array 15. This structure can facilitate forming patterns of transmission lines 6 and alignment marks 7 for an OE chip 10 and a lens array 15 for the OE chip on a top surface of a substrate 5. The substrate 5 may be an organic substrate.

Figure 13:
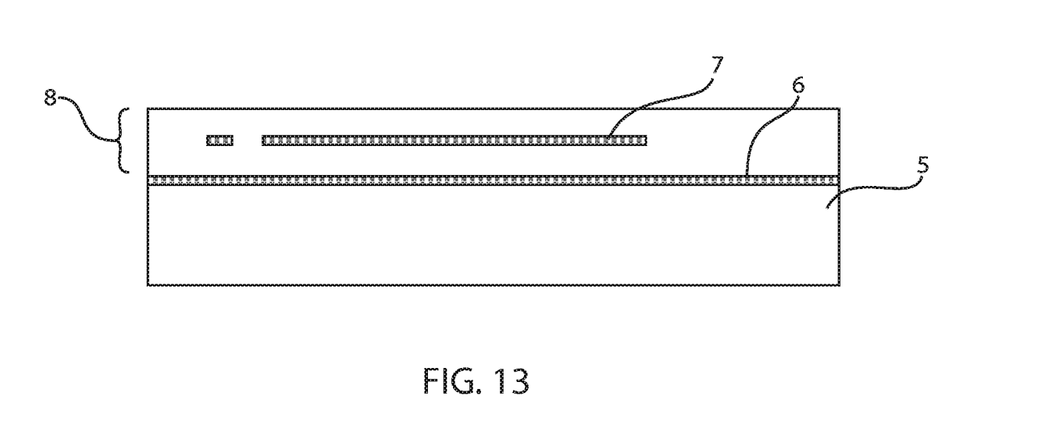
FIG. 13 is a side cross-sectional view depicting forming an insulating layer on the alignment mark that is present overlying the organic substrate depicted in FIG. 12.

FIG. 13 depicts one embodiment of forming an insulating layer 8 on the alignment mark 7 that is present overlying the organic substrate 5 depicted in FIG. 12. The insulating layer 8 may be an oxide, nitride or oxynitride material. The insulating layer 8 may be deposited on chemical vapor deposition or spin on deposition.

Figure 14:
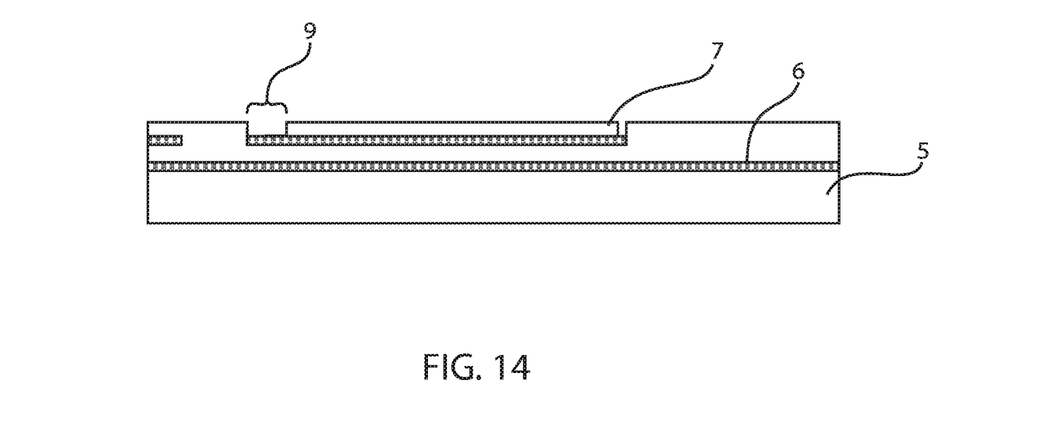
FIG. 14 is a side cross-sectional view depicting forming vias for installing solder for the vertical-cavity surface-emitting laser (VCSEL) and photo diode (PD) components, in accordance with one embodiment of the present invention.

FIG. 14 depicts forming vias 9 for installing solder for the vertical-cavity surface-emitting laser (VCSEL) and photo diode (PD) components, i.e., optoelectronic (OE) devices 10. The vias 9 may also be formed for installing solder for the integrated circuit (IC) chip 35. In some embodiments, the vias 9 may be formed using laser ablation. In other embodiments, the vias 9 may be formed using deposition, photolithography and etch processes. For example, a photoresist layer may be deposited on the surface of the structure depicted in FIG. 13 followed by patterning using photolithography and development to form a photoresist mask. Following photoresist mask development, the structure is then etched, e.g., etched by reactive ion etch (RIE), to form the vias 9.

Figure 8:
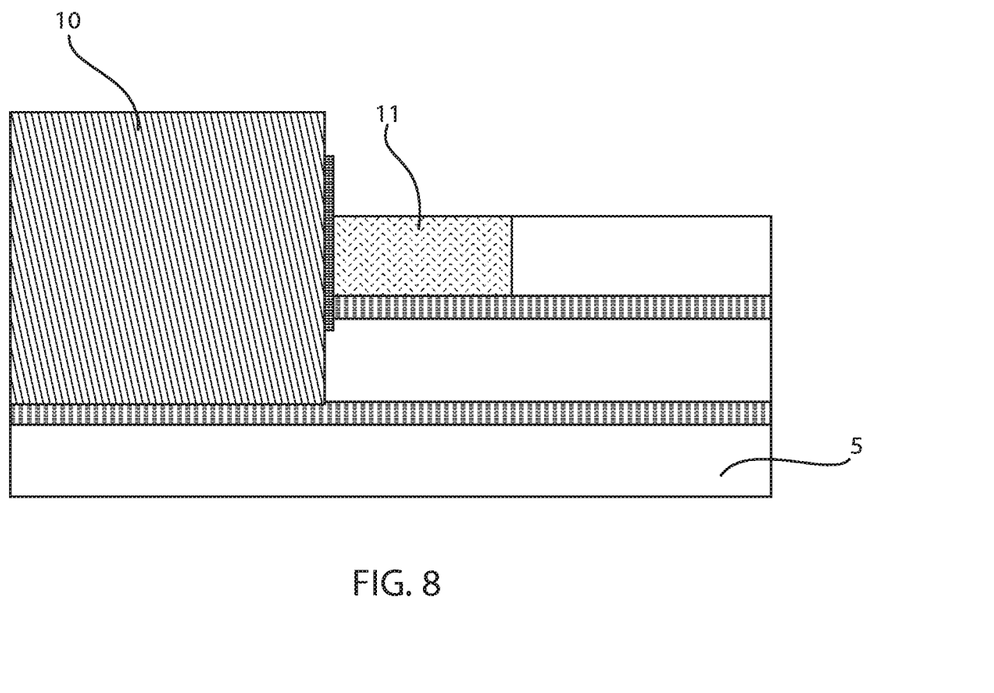
FIG. 8 is a side cross-sectional view of solder prior to remelt, in accordance with one embodiment of the present disclosure.
Figure 15:
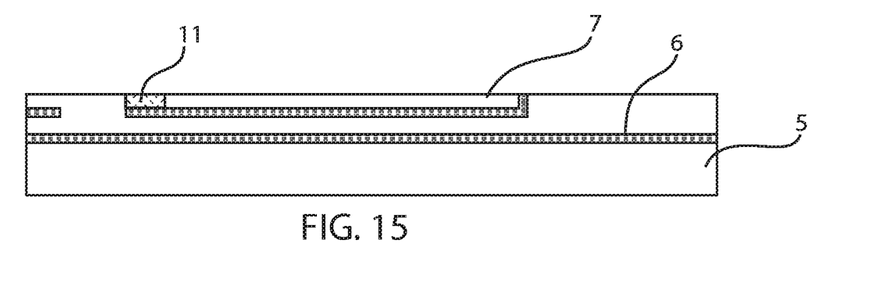
FIG. 15 is a side cross-sectional view depicting filling the vias depicted in FIG. 14 with solder, in accordance with one embodiment of the present disclosure.

FIG. 15 depicts one embodiment of filling the vias depicted in FIG. 14 with solder 11. The term "solder", as used herein, refers to any metal or metallic compound or alloy that is melted and then allowed to cool in order to join two or more metallic surfaces together. Generally speaking, solders have melting temperatures in the range of 150° C. to 250° C. Solder bumps may be small spheres of solder (solder balls) that are bonded to contact areas, interconnect lines or pads of semiconductor devices. In some embodiments, the solder bumps can be made from lead-free solder mixtures or lead tin solder. The solder 11 may be deposited using sputtering. As used herein, "sputtering" means a method of depositing a film of metal material. A target of the desired material, i.e., source, is bombarded with particles, e.g., ions, which knock atoms from the target, and the dislodged target material deposits on the deposition surface. FIG. 8 depicts a magnified view of solder 11 following deposition and prior to remelt.

Figure 16A:
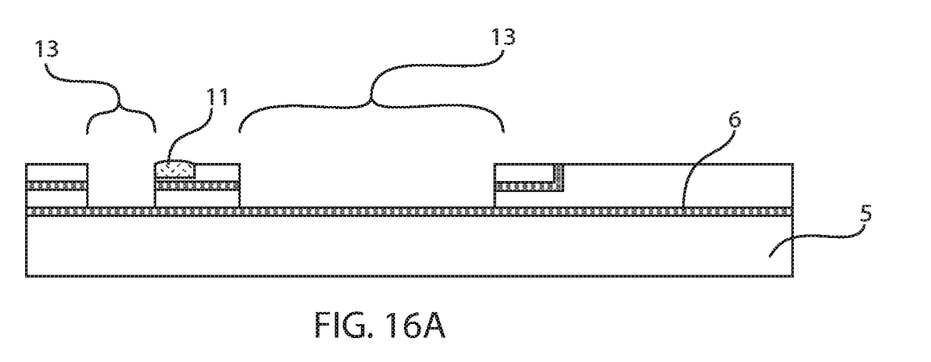
FIG. 16A is a side cross-sectional view depicting forming holes by laser ablation for mounting the vertical-cavity surface-emitting laser (VCSEL) and photo diode (PD) on the organic substrate, in accordance with one embodiment of the present invention.
Figure 16B:
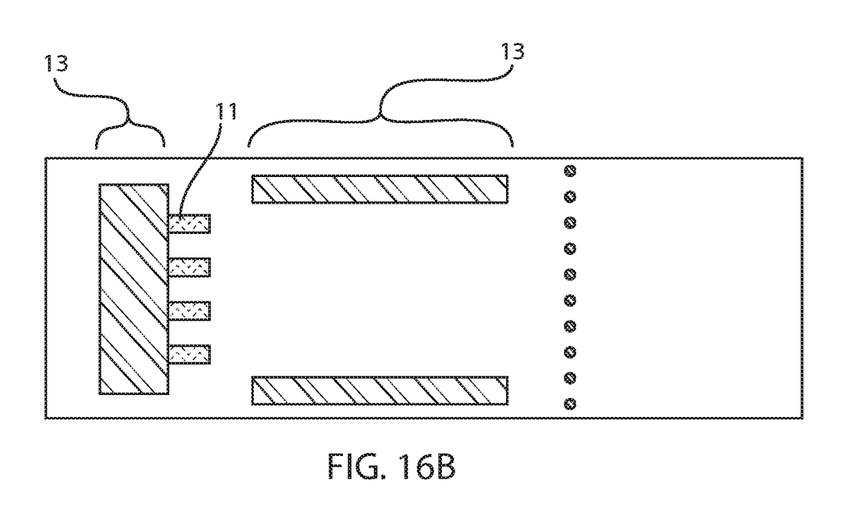
FIG. 16B is a top down view of the structure depicted in FIG. 16A.

FIGS. 16A and 16B depict forming holes 13 by laser ablation for mounting the vertical-cavity surface-emitting laser (VCSEL) and photo diode (PD). i.e., optoelectronic (OE) chip 10, on the organic substrate 5. In other embodiments, the vias 13 may be formed using deposition, photolithography and etch processes. For example, a photoresist layer may be deposited on the surface of the structure depicted in FIGS. 16A and 16B followed by patterning using photolithography and development to form a photoresist mask. Following photoresist mask development, the structure is then etched, e.g., etched by reactive ion etch (RIE), to form the vias 13.

Figure 9:
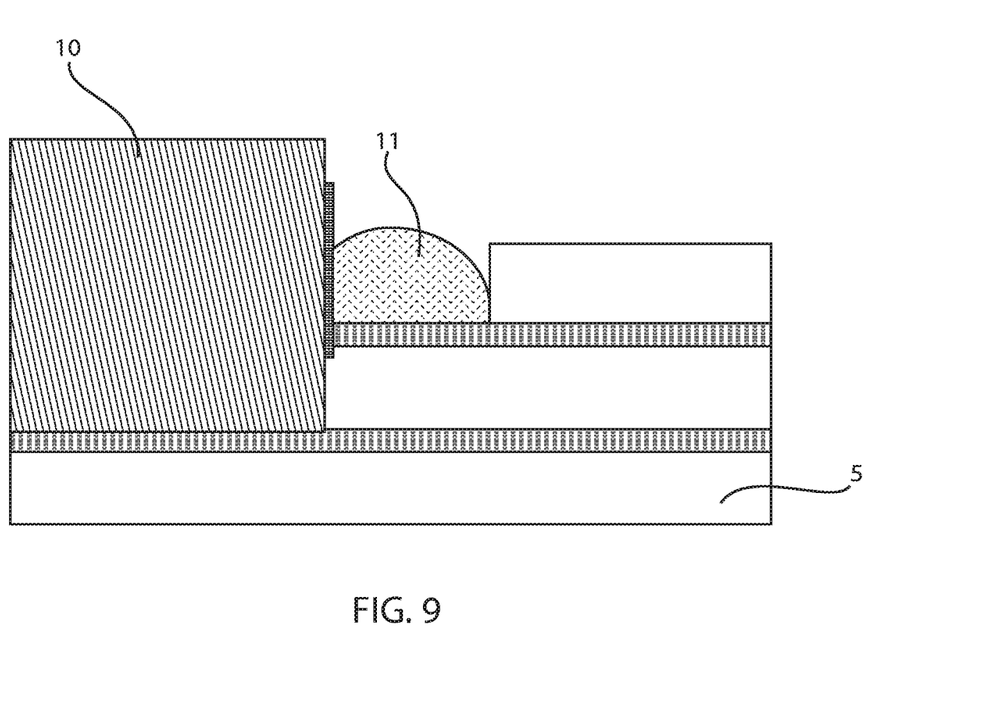
FIG. 9 is a side cross-sectional view of the solder depicted in FIG. 8 at the time of annealing, when the solder forms a ball like geometry.
Figure 10:
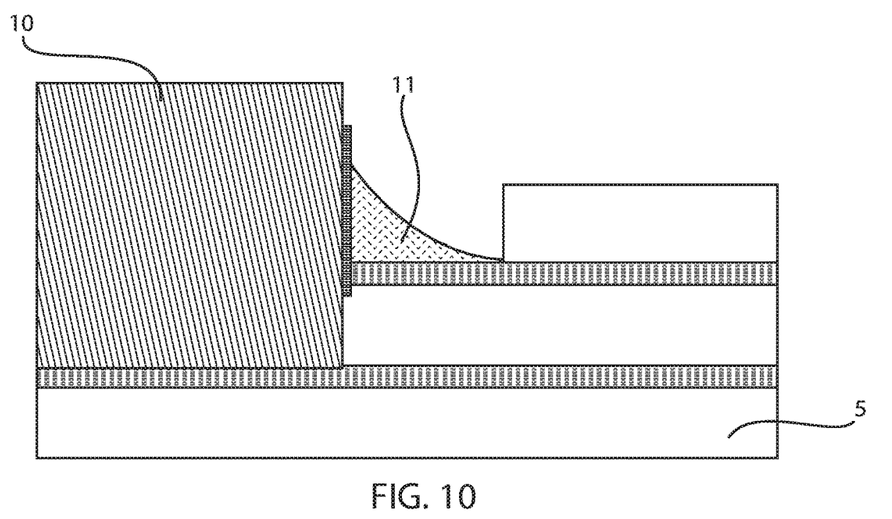
FIG. 10 is a side cross-sectional view of geometry changes that occur to the solder depicted in FIG. 9 following additional annealing, in which the solder spreads through the anodes/cathodes of the vertical-cavity surface-emitting laser (VCSEL) and photo diode (PD) components.
Figure 17:
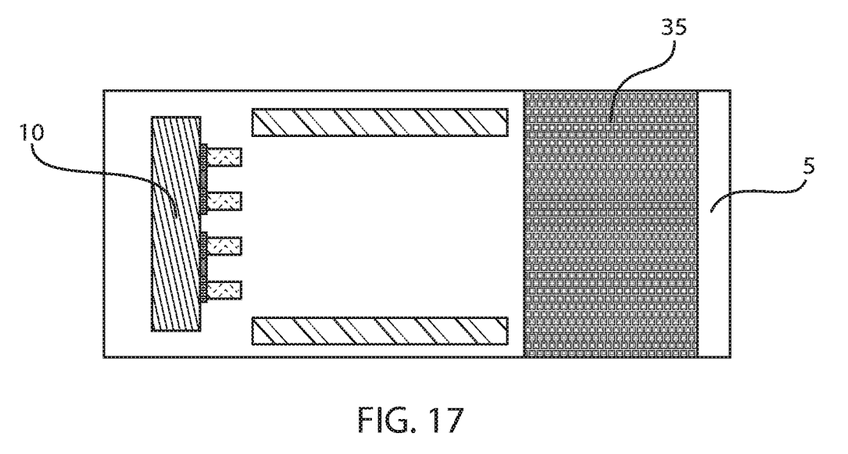
FIG. 17 is a side cross-sectional view depicting mounting the vertical-cavity surface-emitting laser (VCSEL) and photo diode (PD) on the organic substrate, in accordance with one embodiment of the present invention.
Figure 18:
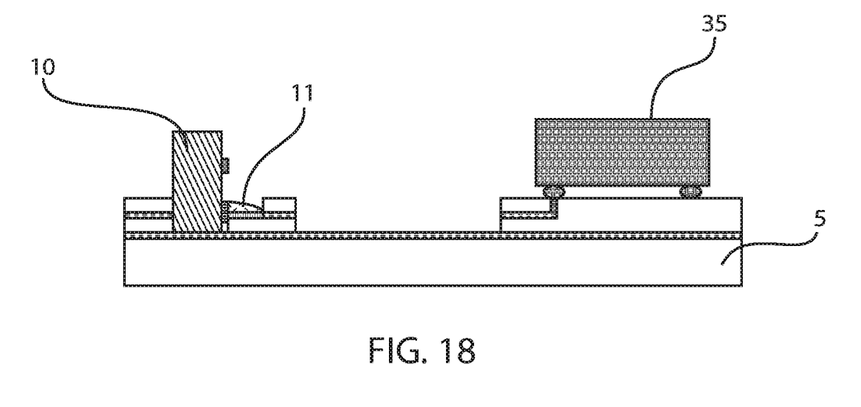
FIG. 18 is a top down view of the structure depicted in FIG. 17.

FIG. 17 depicts one embodiment of mounting the vertical-cavity surface-emitting laser (VCSEL) and/or photo diode (PD). e.g., optoelectronic (OE) chip 10, on the organic substrate. The optoelectronic (OE) chip 10, e.g., the vertical-cavity surface-emitting laser (VCSEL) and/or photo diode (PD), as well as the integrated circuit (IC) chip 35. Mounting can include reflow of the solder 11. Reflow soldering is a process in which a solder paste (a sticky mixture of powdered solder and flux) is used to temporarily attach one or several electrical components to their contact pads, after which the entire assembly is subjected to controlled heat, which melts the solder, permanently connecting the joint. FIG. 9 depicts the solder 11 depicted in FIG. 8 at the time of annealing, when the solder forms a ball like geometry. FIG. 10 depicts the changes of changes that occur to the solder 11 depicted in FIG. 9 following additional annealing, in which the solder 11 spreads through the anodes/cathodes of the vertical-cavity surface-emitting laser (VCSEL) and photo diode (PD) components, i.e., the optoelectronic (OE) chip 10. The vertical-cavity surface-emitting laser (VCSEL) and photo diode (PD) components, i.e., the optoelectronic (OE) chip 10, can be mounted by manual or by thermal compression bonding.

Figure 19:
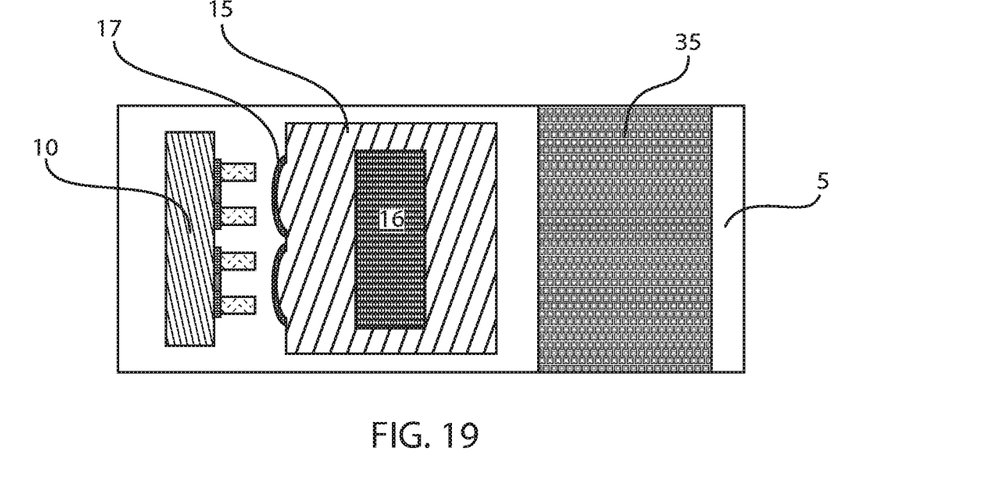
FIG. 19 is a side cross-sectional view depicting mounting the lens array on the organic substrate, in accordance with one embodiment of the present invention.
Figure 20:
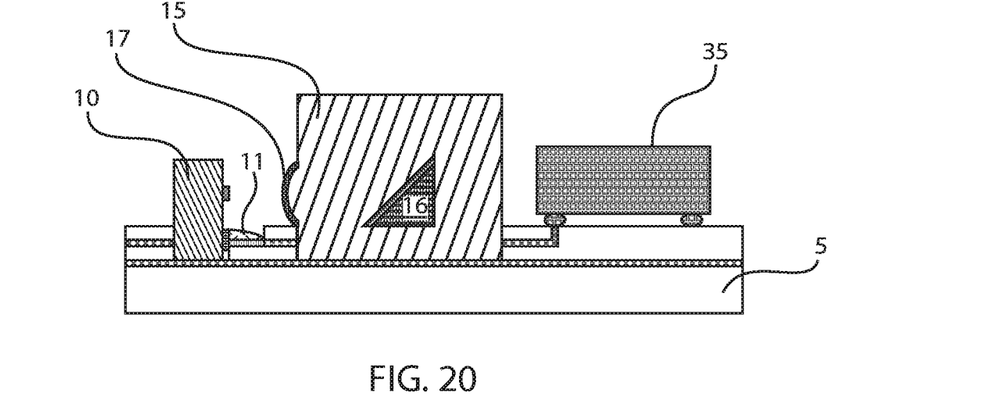
FIG. 20 is a top down view of the structure depicted in FIG. 19.

FIGS. 19-20 depicting mounting the lens array 15 on the organic substrate 5. The lens array 15 can be mounted by adhesive engagement. As discussed above, the lens array 15 has inside a reflector 16 for reflecting light from lateral/downward direction to upward/lateral direction (emission/detection).

Figure 21:
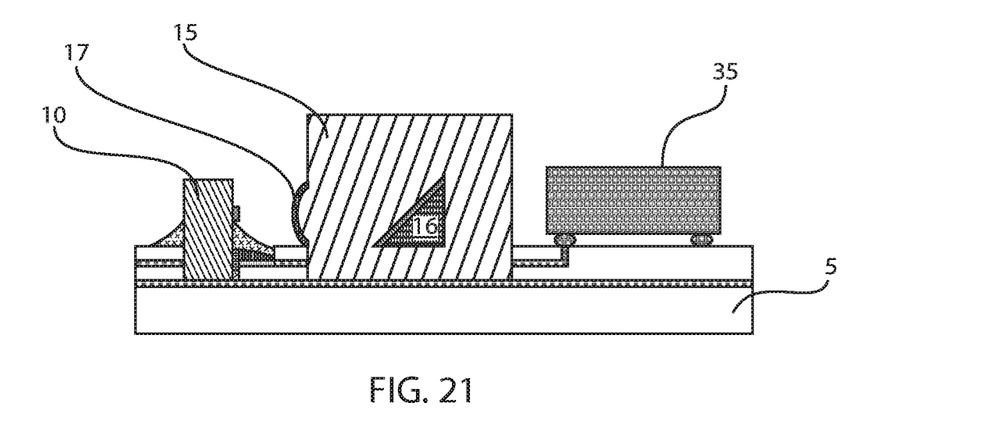
FIG. 21 is a side cross-sectional view depicting fixing the optoelectronic chip and the lens array on the organic substrate using an, in accordance with one embodiment of the present invention.

FIG. 21 depicts fixing the optoelectronic chip 10 and the lens array 15 on the organic substrate 5 using an adhesive engagement. In one embodiment of the present invention, the mounting the OE chip 10 on the holes 13 for the OE chip 10 comprises mounting the OE chip 10 on the holes 13 for the OE chip 10 so that an optically active (emission/detection) area of the OE chip 10 may be directed laterally.

In Optical MCM structure, assuming that the VCSEL emission divergence angle is 26 degrees, the upper cladding thickness is 15 um, the waveguide core size is 25 um, lens curvatures of the connector and the fiber array are 209 μm and 328 μm respectively, the thicknesses of the connector and the fiber array are 500 μm and 850 μm respectively, and the photodiode (PD) diameter is 30 μm, the total insertion loss of the transmitter and the receiver is estimated to be 5 dB.

In accordance with some embodiments of the methods and the structures of the present invention, such as those described with reference to FIGS. 1-21, because the number of mirrors is half (4→2) and waveguides are not used, the loss associated with them (the waveguide propagation loss and coupling losses between the VCSEL, and the waveguide and between the waveguide and the PD) is eliminated, and the simulated insertion loss is reduced to about 1.1 dB.

Moreover, in a conventional structure, the same design of the lens is used for both the transmitter and the receiver so that the 0.2 dB loss is more than for the case of using optimum design for each transmitter and receiver. In the systems provided herein, the lens design can be optimized, since the distances between the VCSEL, and the lens array and between the PD and the lens array are changeable. As bandwidth requirement, will increase and PD diameter decrease, the structure between the waveguide and the PD must be changed in the conventional structure, however in some embodiments only changing the lens curvature and the distance will be needed in the invented structure.

The methods and systems described herein improve yield, because in some embodiments, the waveguide and its complicated process can be omitted. In some embodiments, assembly time can be reduced by reflow process instead of thermal compression bonding process.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B. and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above." "upper." and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

What is claimed is:

1. A chip packaging structure comprising:
an optoelectronic (OE) chip mounted on a first surface of a substrate and whose optically active area is directed laterally;
a first lens array for the optoelectronic (OE) chip that is mounted on the first surface of the substrate and faces to the optoelectronic (OE) chip, wherein a turning structure is encapsulated by material of the first lens array, with the turning structure including a hollow reflector corresponding to a void having a triangular shaped cross-section for reflecting light from a first direction to a second direction substantially perpendicular to the first direction;
a second lens array for an optical fiber for electrical communication with the first lens array, the second lens array including guide pins providing alignment of the first and second lens arrays.

2. The structure of claim 1, wherein the first direction is lateral and the second direction is upward.

3. The structure of claim 1, wherein the first direction is downward and the second direction is lateral.

4. The structure of claim 1, wherein the first lens array comprises a convex side surface facing to the optically active area of the optoelectronic (OE) chip and a planar top surface.

5. The structure of claim 1, wherein the first lens array comprises a planar side surface facing to the optically active area of the optoelectronic (OE) chip and a convex top surface.

6. The structure of claim 1, wherein the optoelectronic (OE) chip has the optically active area on the first side of the substrate and an electrode on a second side of the substrate.

7. The structure of claim 1, further comprising a driver IC (Integrated Circuit) chip for the optoelectronic (OE) chip that is mounted on the first surface of the substrate.

8. A method of chip packaging comprising:
mounting an optoelectronic (OE) chip on a first surface of a substrate having an optically active area is directed laterally;
mounting a first lens array for the optoelectronic (OE) chip that on the first surface of the substrate that faces to the optoelectronic (OE) chip, wherein a turning structure is encapsulated by material of the first lens array, with the turning structure including a hollow reflector corresponding to a void having a triangular shaped cross-section for reflecting light from a first direction to a second direction, in which the first direction is substantially perpendicular to the second direction; and
forming a second lens array for an optical fiber for electrical communication with the first lens array, the second lens array including guide pins providing alignment of the first and second lens arrays.

9. The method of claim 8, wherein the first direction is lateral and the second direction is upward.

10. The method of claim 8, wherein the first direction is downward and the second direction is lateral.

11. The method of claim 8, wherein the first lens array for the optoelectronic (OE) chip comprises a convex side surface facing to the optically active area of the optoelectronic (OE) chip and a planar top surface.

12. The structure of claim 1, wherein the substrate includes an organic substrate.

13. The structure of claim 1, wherein the guide pins are monolithic within the second lens array.

* * * * *